Jan. 17, 1956

R. E. GOTTFRIED 2,731,620

PULSE RESPONSIVE CONTROL APPARATUS
IN A COIN DEMAND SELLING SYSTEM

Filed May 10, 1951

INVENTORS.
Robert E. Gottfried
BY
ATTORNEYS

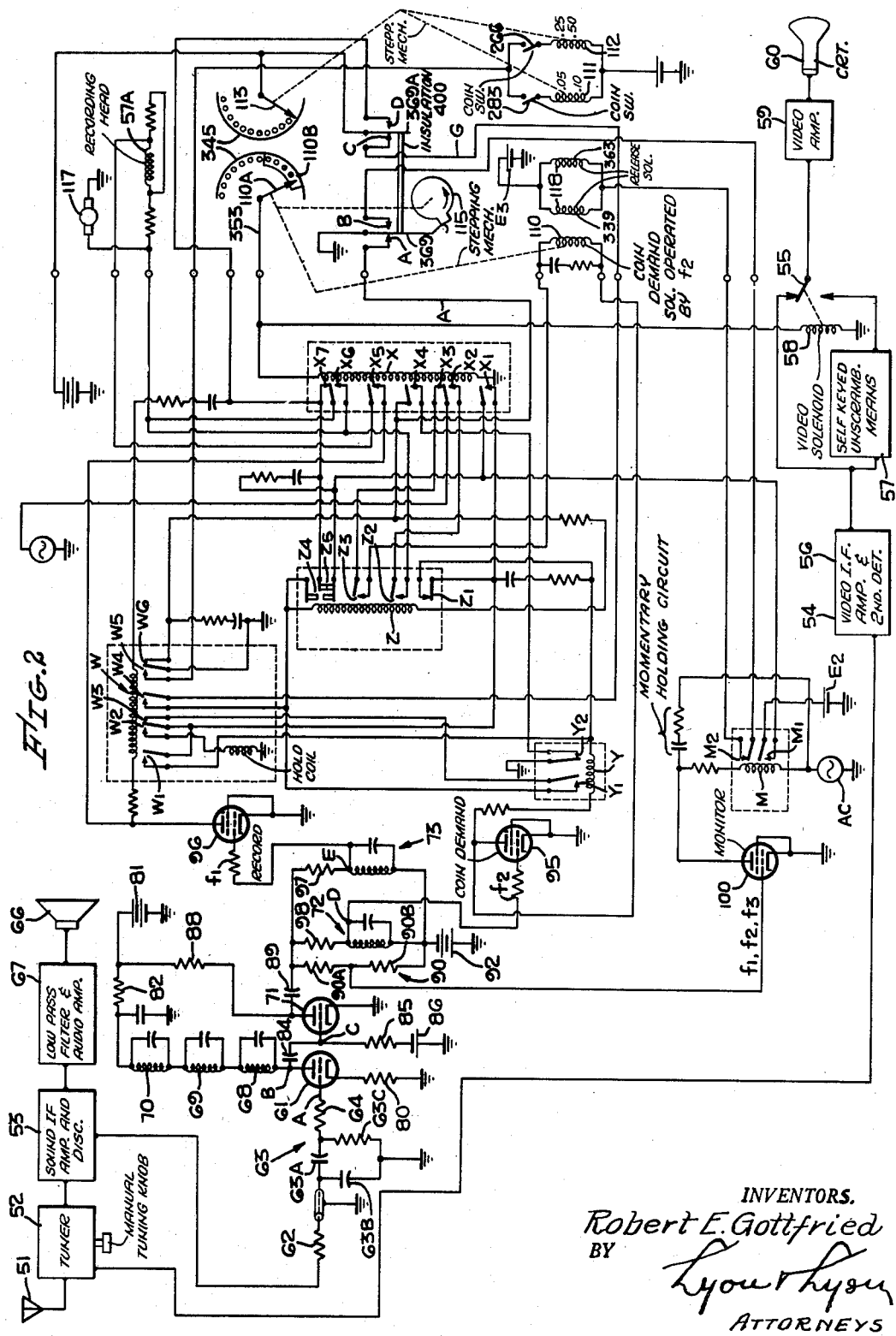

Jan. 17, 1956
R. E. GOTTFRIED
2,731,620
PULSE RESPONSIVE CONTROL APPARATUS
IN A COIN DEMAND SELLING SYSTEM
Filed May 10, 1951
4 Sheets-Sheet 3
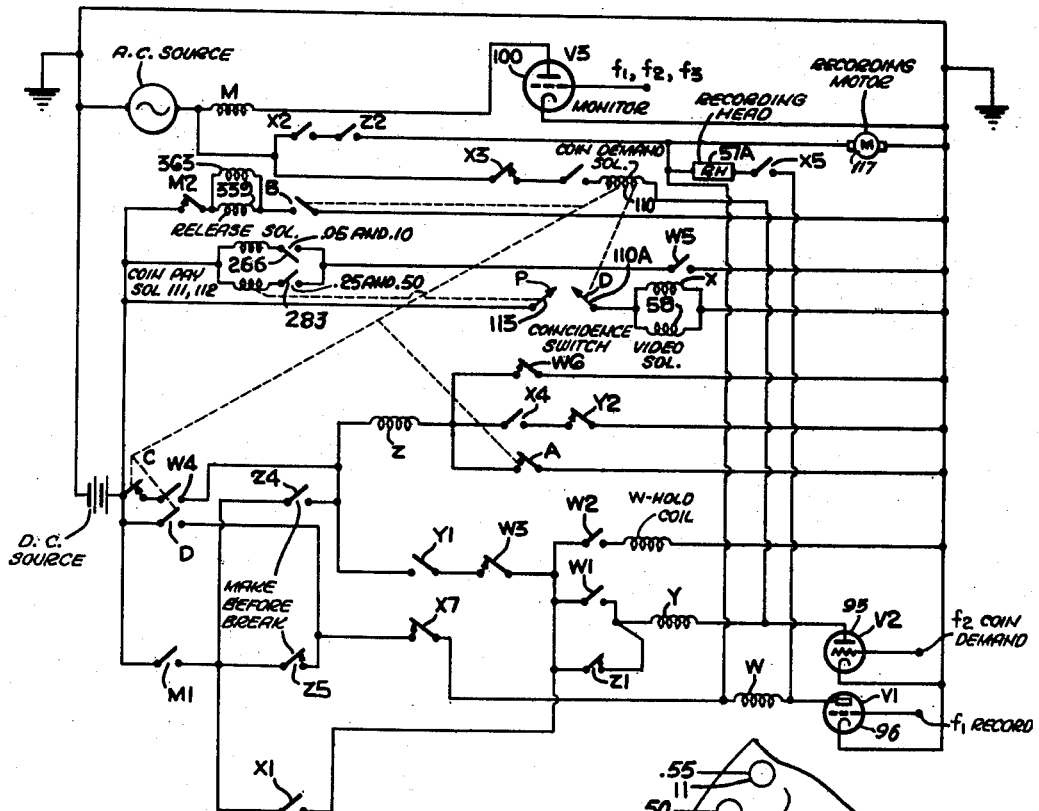
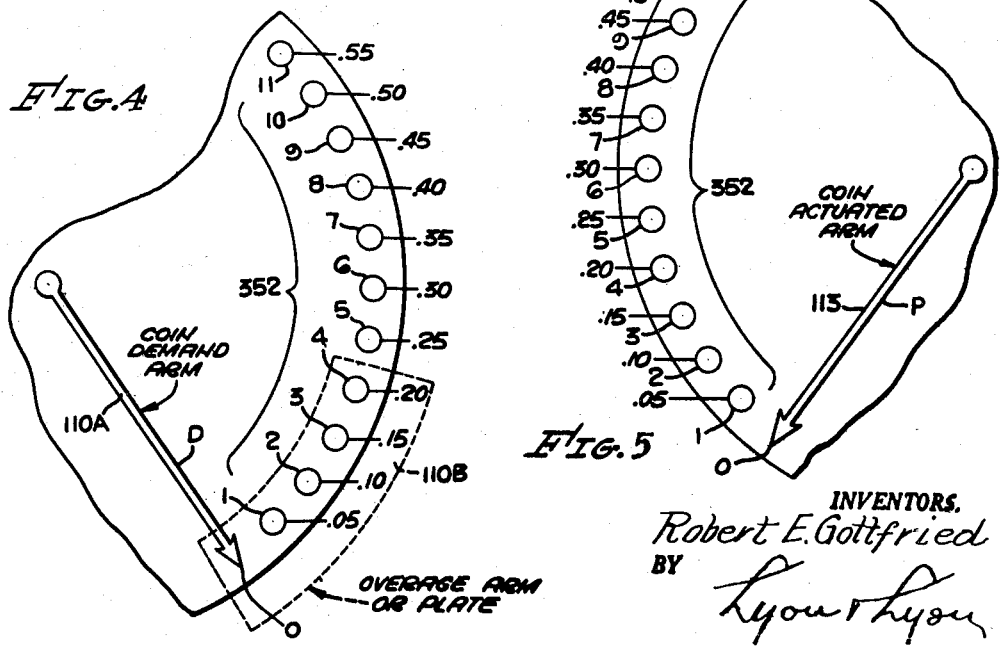
INVENTORS.
Robert E. Gottfried
BY
Lyon & Lyon
ATTORNEYS Jan. 17, 1956
R. E. GOTTFRIED
2,731,620
PULSE RESPONSIVE CONTROL APPARATUS
IN A COIN DEMAND SELLING SYSTEM
Filed May 10, 1951
4 Sheets-Sheet 4
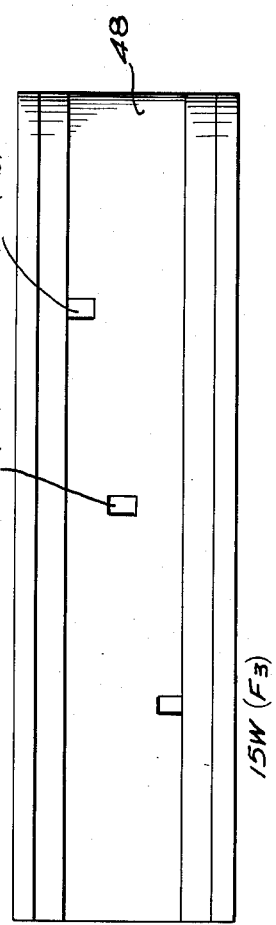
INVENTOR.
ROBERT E. GOTTFRIED
BY
ATTORNEYS

United States Patent Office 2,731,620
Patented Jan. 17, 1956

2,731,620

PULSE RESPONSIVE CONTROL APPARATUS IN A COIN DEMAND SELLING SYSTEM

Robert E. Gottfried, West Los Angeles, Calif., assignor, by mesne assignments, to International Telemeter Corporation, a corporation of Delaware Application May 10, 1951, Serial No. 225,653

4 Claims. (Cl. 340—147)

The present invention relates to improvements in the art of transmitting secret information such as, for example, scrambled or unintelligible television signals, and more specifically to the pulse responsive control apparatus in a system of the character described and claimed in the copending patent application, Serial No. 225,651, filed May 10, 1951, and assigned to the same assignee, wherein in such application I am listed as a joint inventor with Allen D. Hoffmann and Roy M. Skeirik. Such system briefly is of the character which is rendered operative upon the user at the receiving station acknowledging a coin demand which is transmitted from a transmitting station.

While the present invention is embodied and described for use in a television system of this character, it will be apparent that the uses for the same are not limited thereto, and that the claims appended hereto are not specifically limited to such system.

The present invention contemplates improved pulse responsive apparatus for operating in the following order: first, a coin demand apparatus for setting up a coin demand which must first be acknowledged by the user before the pulse responsive apparatus is operative to perform its second and third functions, the second function being to energize the driving motor of recording apparatus, and the third function being to energize the recording head of the recording apparatus. After these three functions are achieved, the apparatus is automatically locked out, i. e., rendered insensitive to further pulses which are continuously transmitted from a related transmitting station.

By the acknowledgment of a coin demand is meant a payment or other indication of the desire to purchase that for which a coin demand is established at the subscriber receiver. The coin demand is the price requested to be paid for enabling the viewing of a program. This price will vary with different programs and, therefore, a coin demand may be considered as a variable price coin demand and the apparatus for establishing it in response to signals from the transmitter is variable price coin-demand apparatus.

As is well known, transmitted television signals comprise a video signal and related sound signal. According to present standards set forth by the Federal Communications Commission, the sound is transmitted on a frequency modulated wave, the mean frequency of which is displaced in the order of 4.5 megacycles from the related video signal. The system described and claimed in the aforementioned patent application uses three different tone signals somewhat above the audible range to modulate the sound wave in the same manner as the audio signal modulates the sound wave. These three tone signals are in the form of coded pulses and occur alternately, one of such tone signals serving to convey coin demand information, a second tone signal serving for recording purposes so that a permanent record may be obtained whereby the collected coins may be identified, and a third tone signal serving for monitoring purposes.

The present invention relates more specifically to the means whereby the aforementioned three tone signals appearing recurrently and alternately as pulses are utilized to effect the operation of novel control apparatus for achieving the aforementioned indicated results.

A specific object of the present invention is to provide improved pulse responsive apparatus which is capable of achieving the aforementioned indicated results with a relatively small number of different pulses, i. e., three different pulses.

Another specific object of the present invention is to provide an improved pulse responsive apparatus of this character whereby the aforementioned functions are achieved in that order regardless of the particular time at which the user may turn on his receiving apparatus or tune his receiving apparatus to an incoming broadcast from a station which continuously transmits such pulses.

Another specific object of the present invention is to provide improved pulse responsive apparatus of this character which automatically locks itself out after the aforementioned cycle of events or functions have been realized.

Another specific object of the present invention is to provide an improved pulse responsive apparatus of this character which automatically clears itself upon the cessation of the pulses which originally caused its actuation.

Another specific object of the present invention is to provide improved pulse responsive apparatus of this character which automatically clears itself upon the user of the receiving apparatus tuning his receiving apparatus for reception from one station to another station.

Another specific object of the present invention is to provide an improved self-clearing pulse responsive control apparatus of this character which does not require the transmission of a clearing signal, and in that respect the present invention may be considered to be an improvement over the arrangement shown in the copending application of Del Riccio et al., Serial No. 189,262, filed October 9, 1950, and assigned to the same assignee, in which the present inventor is listed as a joint inventor with Lorenzo del Riccio, Roy M. Skeirik and Allen D. Hoffmann.

Another specific object of the present invention is to provide an improved pulse responsive control apparatus of this character which essentially utilizes a plurality of tone signals for its operation, the tone signals serving dual purposes of assuring proper sequential operation of the apparatus and also for either establishing a coin demand or effecting a recording, as the case may be.

Another specific object of the present invention is to provide improved pulse responsive control apparatus of this character which is operated by code signals, essentially two in number, i. e., a so-called coin demand signal or pulse and a so-called record code signal or pulse; these two code signals or pulses, however, being useful for other purposes such as for conditioning the apparatus at the receiving station for proper operation regardless of the time at which the user of the receiving set first turns on and/or tunes the set in relationship to the cyclical transmission of such code signals from the transmitter.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 2 is a schematic representation of apparatus at the receiving station which is sensitive to the frequency modulation components of the sound carrier transmitted by the apparatus shown in Figure 1, and includes the pulse responsive control apparatus forming an important part of the present invention;

Figure 3 shows in more simplified form the relay switching arrangement shown in Figure 2;

Figure 1:
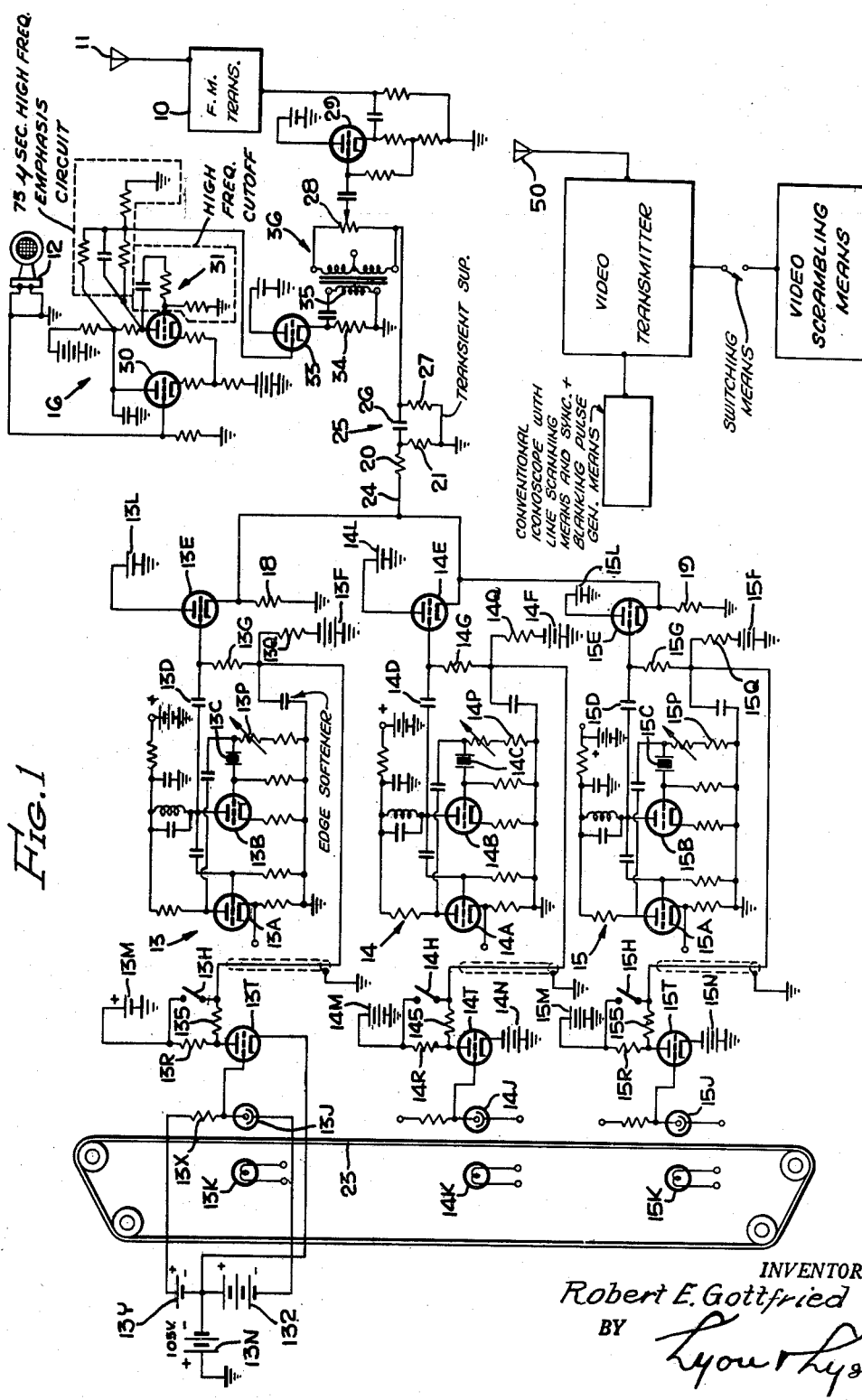
Figure 1 is a schematic diagram of apparatus at one of the plurality of transmitting stations from which code signals or pulses emanate for effecting operation of the pulse responsive apparatus forming an important part of the present invention and shown in Figure 2.

Figures 4 and 5, respectively, show in enlarged form the manner in which the coin demand arm and the coin actuate arm shown in Figures 2 and 3 coact with common stationary contacts for achieving a coincident condition.

Figure 6 shows an apertured plate which insures that three tone signals are developed.

Figure 7 is a plan view of a portion of the endless tape shown in Figure 1 which is used for producing the tone signals.

With reference to Figure 1, the frequency modulated transmitter 10 serves to radiate into space, by means of antenna 11, frequency modulated signals, the components of which comprise first the television program audio signals developed, for example, in microphone, or, for example, phonograph pickup 12, and second the series of tone frequencies or pulses $f_1$, $f_2$ and $f_3$ developed respectively by the tone modulators 13, 14, and 15. The frequency of the tones $f_1$, $f_2$, and $f_3$ may be, for example, respectively as being 17.9 kilocycles, 20 kilocycles and 22 kilocycles, which are frequencies well above the frequencies in the audible range developed in the sound modulator stage 16, which includes the microphone or pickup 12. Although it is preferred that these three tone frequencies lie above the audible band for practical reasons, concepts of the present invention may be practiced when such frequencies $f_1$, $f_2$, $f_3$, or any one of them is a sub-audible frequency.

The modulator stages 13, 14 and 15 each includes continuously oscillating networks which include respectively pairs of tubes 13A, 13B, 14A, 14B, 15A, 15B, the frequency of oscillation in each of such networks 13, 14, 15 being determined by the frequency of the associated crystal 13C, 14C, 15C. While one specific type of supersonic oscillation network is shown in Figure 1, the present invention is not critical in that regard, for it is well understood that other types than the one shown may be used for these purposes. Oscillations developed in networks 13, 14 and 15 are transferred respectively through condensers 13D, 14D and 15D to the control grids of tubes 13E, 14E and 15E, respectively. The cathodes of these tubes 13E, 14E, 15E are returned to ground through parallel connected resistances 18 and 19 as well as by series circuit which includes the serially connected resistances 20 and 21.

While the oscillation networks 13, 14 and 15 continuously oscillate, their voltage output is not normally transferred to the cathode load resistances 18, 19, since in such normal condition the control grids of tubes 13E, 14E and 15E are biased by means described presently to cut off the flow of space current through such tubes. Such biasing means includes corresponding normally heavy conducting tubes 13T, 14T and 15T which have their anodes, normally at a relatively low potential, connected to the control grid of tubes 13E, 14E and 15E, respectively, through series circuits comprising, respectively: resistances 13S and 13G; resistances 14S and 14G; and resistances 15S and 15G. The anodes of tubes 13T, 14T and 15T are connected to a positive terminal of corresponding anode voltage sources 13M, 14M and 15M through corresponding voltage dropping resistances 13R, 14R and 15R. The cathodes of tubes 13T, 14T and 15T are connected to the ungrounded negative terminal of voltage sources 13N, 14N and 15N, respectively. The control grids of tubes 13E, 14E and 15E are returned to ground, respectively, through the following series circuits: resistances 13G, 13Q and source 13F; resistances 14G, 14Q and source 14F; and resistances 15G, 15Q and source 15F. The tubes 13E, 14E and 15E are connected essentially as gated cathode followers and have their anodes connected directly to the positive terminal of voltage sources 13L, 14L and 15L, respectively.

The tubes 13T, 14T and 15T are coupled to phototubes 13J, 14J and 15J, respectively. All these photocells are connected in identical manner, and a detailed description of the connection of phototube 13J suffices to describe the other connections. The phototube 13J is connected in a series circuit with resistance 13X and voltage sources 13Y and 13Z. The anode of the phototube 13J is connected to the control grid of tube 13T, and the junction point of sources 13Y and 13Z is connected to the cathode of tube 13T, so that upon illumination of the tube 13J the control grid of tube 13T is driven negatively with respect to its cathode, to thereby cut off or appreciably reduce the flow of current through tube 13T, with the result that the potential at the anode of tube 13T increases to such an extent that the connected control grid of tube 13E rises sufficiently to become conductive and to thereby allow oscillations developed at the oscillator stage 13 to appear across the cathode output resistance 18.

These tubes 13E, 14E, 15E are rendered conducting either when the associated phototubes 13J, 14J, 15J are energized by the corresponding light sources 13K, 14K and 15K, or, in the alternative, when either one of the corresponding normally open test switches 13H, 14H or 15H is closed. Normally, these phototubes 13J, 14J, 15J are not illuminated because of the opaque endless tape 23 which, however, is suitably apertured to allow alternate illumination of such phototubes. It is noted that only one of the phototubes 13J, 14J, 15J is thus illuminated at any one particular time. Effectively, the normally non-conducting tubes 13E, 14E, 15E are gated on in timed sequence with movement of the tape 23, to thereby allow super-audible signals of frequencies $f_1$, $f_2$ and $f_3$ to alternately appear on the output lead 24.

The tape for the generation of the super-audible signals $f_1$, $f_2$, and $f_3$ may be more clearly seen by regarding Figures 6 and 7 of the drawings. The perforated plate 48 is interposed between the photocells and the tape so that each of the three photocells is respectively positioned opposite aperture 13W, 14W, and 15W (respectively aligned with photocells 13J, 14J, and 15J). The $f_1$ signals are generated by means of the apertures in the tape 14V passing by the plate aperture 14W. The $f_2$ signals are generated by means of the apertures in the tape 13V passing by the perforation 13W, and the perforations in the tape 15V generate the $f_3$ signals in passing under aperture 15W.

It is observed that the adjustable resistances 13P, 14P and 15P in corresponding modulator stages 13, 14 and 15 are used to adjust the level of the corresponding signals $f_1$, $f_2$ and $f_3$ appearing on the lead 24. These signals appearing on lead 24 are transferred through the transient suppressing network 25 which includes the series condenser 26 and shunt connected resistance 27. The lead 24 is thus connected through serially connected resistance 20 and condenser 26, and through the adjustable tap on the potentiometer resistance 28 to the control grid of the cathode follower tube 29, on the grid of which is also applied the audio signals developed by the microphone or pickup 12. The current or voltage variations developed by such transducer 12 are applied to the control grid of the amplifying stage 30. The amplified output appearing on the anode of tube 30 is transferred through a conventional 75-microsecond emphasis circuit 31 for purposes of emphasizing the high frequencies in accordance with well established frequency modulating transmission techniques. The output of this network 31 is transferred to the control grid of the cathode follower tube 33, the cathode load resistance 34 of which is in shunt with the primary winding 35 of the transformer 36. The secondary winding of transformer 36 is connected to opposite outside terminals of potentiometer resistance 28, so that the movable tap on the resistance 28 may be adjusted to correspondingly adjust the output level of audio signal applied to the control grid of tube 29. The resulting mixed audio and tone signals appearing on the cathode of tube 29 are applied to the frequency modulation transmitter 10 and appear as frequency modulated components on the wave transmitted from antenna 11.

Thus it is evident from the above description that the transmitter shown in Figure 1 serves to radiate into space a frequency modulated wave, the modulation components of which include a sound developed by transducer 12 and the tone signals of frequencies $f_1$, $f_2$ and $f_3$, which tone frequencies alternately appear as components in the radiated wave. The receiver shown in Figure 2 serves to demodulate the modulation components of the aforementioned frequency modulated wave to reproduce the sound components as well as to perform certain control operations in accordance with the signals of frequencies $f_1$, $f_2$ and $f_3$.

Besides transmitting the aforementioned frequency modulated wave, the station also sends out a scrambled video signal by means of the video antenna 50. Thus the transmission from antennas 11 and 50 contain all of the information required for recreation of the program televised, provided of course that means are present at the receiving station indicated in Figure 2 for unscrambling the received video signals. So far as the present invention is concerned, the scrambling means at the transmitter and the unscrambling means at the receiver may take different forms, different systems of which are shown in the prior art, but the one preferred is the one shown and claimed in the copending application of Allen D. Hoffmann and Robert E. Gottfried, Serial No. 224,622, filed May 4, 1951, and assigned to the same assignee as the present invention.

The receiver shown in Figure 2 includes the conventional antenna 51 coupled to the conventional channel tuner 52. The receiver shown is of the so-called dual-I. F. type using the superheterodyne principle, and the sound frequencies of intermediate frequencies are impressed on the "Sound I. F. and discriminator" stage 53, while the signals of video appearing at a different intermediate frequency are applied to the "Video I. F. amplifier" 54. The output of the I. F. amplifier 54 and second detector 56 is applied to one of the contacts of the single pole double throw relay switch 55 and the unscrambling means 57. Pole 55 selects either output from 54, 56 or 57 depending upon the energized condition of the video relay winding 58. The output of the detector stage 56 and unscrambling means 57 is applied to the video amplifier 59, which in turn is coupled to the picture tube 60. Normally, the relay switch 55 is in the position shown in Figure 2, and in such case a scrambled picture apppears on the viewing surface of the cathode ray picture tube 60. The video relay winding 58 is energized only when certain conditions are realized, such conditions being described in detail hereinafter, but when such conditions occur, the unscrambling means 57 is connected to the video amplifier to cause a clear picture to appear on the viewing surface of the tube 60. The means whereby the winding 58 may be energized is now described in detail.

The aforementioned frequency modulated wave, after being detected in the stage 53, is applied to the control grid of tube 61 through the isolating resistance 62 and bandpass filter 63 and resistance 64, for purposes of separating the tone signals of frequencies $f_1$, $f_2$ and $f_3$. Also, for purposes of reproducing the sound components developed by the transducer 12 (Figure 1), the output of the stage 53 is applied to the speaker 66 after passing through the low pass filter and audio amplifier stage 67.

It is noted that the three tone signals have frequencies which lie relatively close to each other, namely 17.9, 20 and 22 kilocycles, respectively. The means described presently for separating these tone signals at the receiver from each other, and from the sound, incorporates important features of the present invention, and briefly comprises the high bandpass filter 63, a so-called jaguar-toothed amplifier, including tube 61 and serially connected high Q (quality factor) tuned circuits 68, 69 and 70, as well as the pickoff stage 71 and the tuned circuits 72, 73.

The bandpass filter 63 includes the series condenser 63A and shunt connected condenser 63B and resistance 63C, and while other high bandpass circuits may be provided for this general purpose of decreasing the amplitude of the sound audio appearing on the control grid of tube 61, the simple one shown herein is preferred for this purpose. It is observed that the tuned circuits 72, 73 are coupled to the anode of tube 71 and thus have a selective effect on the signals.

The tube 61 is preferably a triode, and for purposes of increasing the effective plate resistance of the same its cathode is returned to ground through the resistance 80, and its anode is connected to the positive terminal of voltage source 81 through the serially connected tuned circuits 68, 69, 70 and decoupling resistance 82, the circuits 68, 69 and 70 being parallel tuned, respectively, to frequencies $f_1$, $f_2$ and $f_3$. The anode of tube 61 is coupled through condenser 84 to the control grid of tube 71, such control grid being returned to the negative ungrounded terminal of voltage source 86 through resistance 85. The cathode of tube 71 is grounded, and the voltage of source 86 is relatively small, in the order of 3½ volts, for purposes of maintaining tube 71 normally, in its quiescent state, non-conducting and of obtaining grid limiting of the incoming signal. The anode of tube 71 is connected to the positive terminal of source 81 through the coupling resistance 88. The signal developed on the anode of tube 71 is coupled, by means of condenser 89, to three separate circuits, namely, the tuned circuit 72, the tuned circuit 73, and the voltage dividing circuit 90. These circuits 72, 73 and 90 are connected in shunt with each other and have one of their terminals connected to the ungrounded negative terminal of voltage source 92, which serves as a bias voltage for the control grids of tubes 95 and 96, which are coupled respectively to the tuned circuits 72 and 73. Resistance 97 is serially connected to the tuned circuit 73, and likewise resistance 98 is serially connected with the tuned circuit 72. The voltage dividing circuit 90 comprises serially connected resistances 90A and 90B, the junction point of which is connected to the control grid of the monitoring tube 100.

While the filter circuit 63 serves as a pre-filter, a greater portion of the frequency selectivity is obtained using the so-called jaguar-tooth type of amplifier which includes the serially connected circuits 68, 69, 70 and also by the use of tuned circuits 72, 73. While the amplifier tube 61 produces a discrimination as to frequency, the following stage 71 introduces discrimination as to amplitude by selecting or picking off the upper portions of the voltage waves at the anode of tube 61.

Another feature of the tube 71 is that it serves essentially as an amplitude limiter because of limiting action of its control grid, i. e., grid-cathode conduction occurs after the signals appearing on the anode of tube 61 reach a predetermined threshold value, and it is this threshold value which is maintained substantially constant by limiting on the control grid of tube 71. The signals appearing on the anode of tube 71 are further filtered, using the tuned circuits 72, 73, which are tuned respectively to frequencies $f_2$ and $f_1$. Thus, tone signals of frequency $f_1$ are applied to the control grid of record tube 96; tone signals of frequency $f_2$ are applied to the control grid of coin demand tube 95; and tone signals of frequencies $f_1$, $f_2$ and $f_3$ are applied to the control grid of so-called monitoring tube 100 as clearly shown in Figure 3 wherein the cathode of tube 100 is grounded and the anode of tube 100 is connected to the ungrounded terminal of the A. C. source through relay winding M, so that winding M is energized so long as pulses, either $f_1$, $f_2$ or $f_3$ pulses, are applied to the control grid of tube 100. This tube 100 serves as a monitor for a so-called "paid" program to energize winding M when the receiver is tuned to a paid program.

It is by the use of the tone signals of frequencies $f_1$, $f_2$ and $f_3$, which are applied alternately and in sequence, that the control apparatus shown to the right in Figure 2 is actuated in the following described manner, to cause energization of the video solenoid 58, to cause unscrambling of the video and energization of the recording head 57A, to cause recording, in coded form, of the day, hour and station.

*Pulse distribution unit actuated by tone signals $f_1$, $f_2$ and $f_3$*

In general, the purpose of the pulse distribution system shown in Figure 2 is to utilize the signals of frequencies of $f_1$, $f_2$ and $f_3$ so that the following functions are performed: (1) Stepping the coin demand solenoid actuated mechanism in accordance with the number of $f_2$ pulses to a position dictated by the price of a particular program, whereby the user may pay or acknowledge the demanded price and thus cause the production of an unscrambled picture; (2) recording the number of $f_1$ pulses, using recorder 57A, 117, to thereby obtain a permanent record of the program after coincidence has occurred, i. e., after the user has paid or acknowledged the demanded price.

It should be observed that the $f_1$, $f_2$, $f_3$ pulses are transmitted in sequence during the transmission of a so-called "paid" program. Thus, a user or subscriber of the system, at the time he tunes his receiver to the station transmitting a paid program, will, at that instant, receive either $f_1$, $f_2$ or $f_3$ pulses, depending of course what type of pulses are being transmitted at that particular instant. As mentioned previously, the number of $f_1$ pulses serves to identify the program, the $f_2$ pulses serve to establish a coin demand depending upon the number of such $f_2$ pulses. It is therefore necessary that means be provided herein to assure a proper sequencing of the relays regardless of the time at which a subscriber tunes in his receiver in relationship to the character of the pulse being transmitted at that particular time. It is necessary that, first, a coin demand be established, such coin demand being truly representative of the number of $f_2$ pulses. It is further necessary that the recording be truly representative of the number of $f_1$ pulses and that such recording should be made only after a coin demand has been established by the correct number of $f_2$ pulses and after a subscriber has acknowledged such coin demand by inserting the proper coinage. For these purposes, as will be more evident from the following description, the $f_1$ pulses serve to condition the apparatus for proper reception of the $f_2$ pulses and correct actuation of the coin demand stepping mechanism. Thus, assuming that $f_2$ pulses are being transmitted at the instant when a subscriber tunes his receiver to a paid program, the coin demand stepping mechanism will not be actuated in accordance with such $f_2$ pulses but will be actuated only after $f_1$ pulses are received and the apparatus is properly conditioned for reception of the full number of $f_2$ pulses. Likewise, after a coin demand is established by the $f_2$ pulses, consideration is given to the fact that a certain unpredictable time is required for a user or subscriber to insert the proper coinage, i. e. to acknowledge the coin demand. The apparatus described herein functions to make a recording of the $f_1$ pulses only after a coin demand has been made and has been acknowledged. It is therefore necessary to properly condition the apparatus once a coin acknowledgement has been made, to properly record all of the $f_1$ pulses. For that purpose, as described more fully hereinafter, the $f_2$ pulses serve to condition the apparatus for proper recording of a full sequence of $f_1$ pulses so that a permanent record of the program may be obtained in terms of the number of such $f_1$ pulses. Thus, assuming that, at the time a coin acknowledgement is made and $f_1$ pulses are at that time being transmitted, a recording will not be made at that particular time of such $f_1$ pulses since there is a likelihood that all of such $f_1$ pulses would not be recorded; therefore, the recording apparatus is rendered sensitive for the recording of $f_1$ pulses only after it has been properly conditioned by the reception of $f_2$ pulses. Thus, the system described herein incorporates means for preventing operation of the coin demand mechanism until it has been conditioned for operation by the $f_1$ pulses; and likewise, the system described herein incorporates means for preventing a recording until such recording apparatus has been conditioned for proper operation by reception of $f_2$ pulses.

Briefly, the tone signals of frequency $f_2$ cause operation of a stepping mechanism a number of times in accordance with the number of openings 13V in the tape 23 at the transmitter. Each one of the openings 13V represents five cents, so that the series of nine openings represents a program having a value of forty-five cents. In other words, the coin demand solenoid 110 is actuated nine times in response to the nine apertures 13V in the tape 23, to cause the switch arm 110A to be moved over a corresponding number of stationary contacts having numerals 1, 2, 3, 4, 5, 6, 7, 8, 9, 10 and 11 in Figure 4. By this expedient, a visual representation may be made of the amount required in order to produce unscrambled video. In such case, the visual indication would be forty-five cents, and upon inserting the required coins in the coin operated mechanism of the character shown herein and in the copending patent application of Lorenzo del Riccio, Serial No. 189,262, filed October 9, 1950, and assigned to the same assignee as the present invention, the coin pay solenoids 111, 112 are actuated to step the switch arm 113 to a position where it corresponds with the position of the switch arm 110A, and in such case there is what is termed herein as a coincident condition. In order to allow a person to operate the apparatus not having the required change, i. e., in this instance forty-five cents, but a fifty-cent piece, an arcuate contact arm 110B is mounted on the end of arm 110A to allow the coincident condition to be realized even though the arms 110A, 113 themselves are not rotated the same angular distance by their respective stepping mechanisms. When this coincident condition is achieved, the video solenoid 58 is automatically energized to cause an unscrambled picture, and the recording head 57A is likewise energized through switch X5 and a recording is automatically made of the number of $f_1$ pulses passing through the said recording head to thereby obtain a permanent record of the program which has been acknowledged.

The manner in which these aforementioned results are obtained is now described in relationship to the specific apparatus for accomplishing the same. The signals of frequencies $f_1$, $f_2$ and $f_3$, in the form of coded pulses, are available continuously throughout any one program. They occur alternately, that is, no two ever are present simultaneously. It is noted that the signal of frequency $f_1$ contains the record information, and that the signal of frequency $f_2$ contains the coin demand information, while the tone signal $f_3$ is for monitoring purposes, i. e., for filling in purposes, so that the apparatus receives signals even though there is no $f_1$ or $f_2$ signal present.

A feature of the system is that it is able to operate correctly even though the user tunes in his receiver at any time during motion of the endless tape 23 at the transmitting station.

Another subsidiary feature is that after a complete cycle, that is, after the recording has taken place, the system locks itself out so that it does not respond to further incoming information.

Initially, when the system is turned on or the particular station is tuned in, thyratron tube 100 is fired since tone signals of frequencies $f_1$, $f_2$ and $f_3$ are applied to such tube, and it will remain fired as long as the receiver is tuned to a paid program.

Initially, the system is as shown in its deenergized condition. For matter of convenience, the windings of the relays have certain reference letters, while the switches which are actuated when the corresponding relay winding is energized have the same reference letter but with a different number appended thereto. When turned on to a paid program, relay M is energized and thus makes direct current voltage available through its switch M1 to other parts of the system. The plate load relay W of tube 96 is then supplied with direct current voltage through switch X7 and switch Z5. Under this condition there is no voltage applied to either of the plate loads connected to tube 95.

Thus, the system "sees" nothing until the first $f_1$ pulse fires the thyratron tube 96. When this occurs relay W is energized and a D.-C. voltage is applied through switch W4 to relay Z. Relay Z remains energized through its switch Z4, which is normally open and cooperates with switch Z5 in such a manner that the switch Z4 is closed before switch Z5 is opened. Thus, when relay Z is energized switch Z5 interrupts the current to relay W, i. e. the current which flows from the ungrounded terminal of the D. C. source through switches Z5, X7, winding W, tube 96 and through the D. C. source. This, of course, happens very rapidly and relay W is energized just momentarily, the aforementioned current flowing through the relay winding W and tube 96 being interrupted after each $f_1$ pulse.

With relay Z thus energized there is now available an alternating current voltage through switch Z3 which is applied to a plate load, i. e., the coin demand solenoid 110 in the plate circuit of tube 95.

Further incoming pulses of frequency $f_1$ have no effect, and the system is now set up to respond to pulses of frequency $f_2$.

Pulses of frequency $f_2$ are now received and fire tube 95, which in turn causes operation of the coin demand solenoid a number of times corresponding to the number of pulses transmitted from the transmitting station, i. e., the number of openings 13V in the tape 23.

As the coin demand solenoid 110 is operated, the coin demand cam 115 is likewise rotated in a step by step manner to cause actuation of switch A, so as to remove one of the grounds on the hold coil Z. The hold coil Z still remains energized, however, through a ground connection provided by switch W6. The switch D is likewise under this condition actuated so as to apply a D.-C. voltage to the relay W through switch X7. Thus, once again tube 96 is in a firable condition. After the $f_2$ cycle, the first $f_1$ pulse to arrive fires tube 96, thereby energizing relay W, which in turn removes the only other ground provided for relay Z, so that now the relay Z becomes deenergized. The system at this stage is in a dormant condition and remains so until the condition of coincidence is met, i. e., until the coin pay solenoid is energized by the user inserting the required coins in the apparatus.

After the coin demand has been made the next succeeding $f_1$ pulse causes relay W to be energized by a current which flows from the ungrounded terminal of the D. C. source through switches D, X7, winding W, tube 96, and through the D. C. source, and in such case the coin pay solenoids have complete circuits through the switch W5, such circuits extending from the ungrounded terminal of the D. C. source from the coin pay solenoids 111, 112 through the coin operated switches 266, 283, through switch W5 and the D. C. source, through the coincidence switch 113, 110A (P, D) through winding X and through such D. C. source. When the "coin pay" arm 113 has been ratcheted up to a coincidence point upon repeated operation of the solenoid 111 and/or 112, as the case may be, a D.-C. voltage is applied to relay X, causing this relay to be energized. In such case, the current flows from the ungrounded terminal of the D. C. source through the aforementioned circuit.

When relay X is energized as described above several new conditions are achieved. First, the video solenoid 58 is energized since it is in parallel with winding X so that the program is now intelligible for the viewer. Second, there is introduced into the anode circuit of tube 96 through switch X5 a shunt plate load which comprises the recording head 57A. There is, however, no voltage applied to these loads so tube 96 is not in condition for firing; but there is a D.-C. voltage applied to relay Y which is the plate load of tube 95. This voltage is applied through switches X1 and Z1.

Thus, the first $f_2$ pulse after coincidence fires tube 95. This in turn causes energization of relay Y and causes a D.-C. voltage to be applied through switch Y1 to relay Z.

As stated before, relay Z acts as a hold coil through its own (make-before-break) switch Z4. Thus relay Z becomes energized and then opens switch Z1, so that the D.-C. voltage theretofore applied to relay Y is removed. This happens very rapidly and relay Y is energized just momentarily.

The relay Z is energized causing an A.-C. voltage to be applied to the plate loads, i. e., relay W and recording head 57A through switches X2 and Z2 of relay Z, so that tube 96 is in condition for firing. Also at this point tape drive motor 117 becomes energized through switches Z2 and X2.

Then the next $f_1$ pulse fires tube 96 to cause the particular information, in coded form, to be recorded on tape driven by motor 117. The first $f_1$ pulse which fires tube 96 also causes energization of relay W. At this stage the hold coil of relay W is energized, since there is a D.-C. voltage on the movable contact of switch W2.

At this stage all the contacts of relay W are maintained at a hold condition. Thus a D. C. voltage is once more applied to relay Y through contacts W1, so that the relay Z is grounded only through switch Y2.

Therefore, with the tube 95 in a firable condition, the first $f_2$ pulse, after the recording cycle, i. e., after the $f_1$ pulses, fires tube 95 and causes energization of relay Y.

With relay Y energized, the only other ground, i. e., through switch Y2 of relay Z, is removed and relay Z thus becomes deenergized.

Thus at this time there is no voltage on the anodes of tubes 96 and 95, so that the system is locked out, i. e., it will not respond to further incoming pulses, but of course the tube 100 remains continuously conducting because of the pulses $f_1$, $f_2$ and $f_3$.

At the end of the program at the transmitter, the coded pulses are no longer transmitted, and when this happens tube 100 becomes deionized and relay M becomes deenergized.

With relay M deenergized, the release solenoid 118 is energized through switches M2 and B, so that all mechanical components associated with the coin demand and coin pay solenoids return to initial conditions. Also, the D. C. voltage is then removed from the system since switch M1 is now open.

It is evident that the above result, i. e., returning of the apparatus to normal condition, may be produced merely by tuning the receiver to a different channel. Thus, with the system cleared, it is ready to repeat the cycle whenever again tuned to a paid program.

It is noted that the $f_1$, $f_2$ and $f_3$ pulses applied to the control grid of the monitoring tube 100 appear recurrently and alternately with some appreciable time interval between succeeding pulses, and for that reason there is a possibility that the relay M connected in the anode circuit of tube 100 and energized from the A. C. source may drop out between application of such pulses. In order to prevent such dropping out, or to prolong the dropping out time, a so-called "momentary holding circuit" comprising a serially connected condenser and resistance is connected in parallel with the relay winding M.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a selling system of the type including a transmitter having a source of a first pulse series and a second pulse series occurring recurrently and alternately representative of data including pricing data which it is desired to transmit to a receiver to enable apparatus to establish a variable price coin demand at said receiver and to enable purchase at said receiver by satisfaction of said coin demand, said receiver including means to receive said pulses from said transmitter, means for establishing a variable price coin demand responsive to a complete first pulse series, open-circuit network means coupling said means to receive said pulses and said means for establishing a coin demand, means for closing said open-circuit network means responsive to pulses from said second pulse series whereby said means to establish a coin demand is actuated by a complete first pulse series, means to acknowledge the coin demand established by said actuation to effectuate a purchase, and means to restore said means for establishing a coin demand to an initial position responsive to a termination of pulses from said source.

2. In a selling system of the type including a transmitter having a source of a first pulse series and a second pulse series occurring recurrently and alternately representative of data including pricing data which it is desired to transmit to a receiver to enable apparatus to establish a variable price coin demand at said receiver and to enable purchase at said receiver by satisfaction of said coin demand, said receiver including means to receive said pulses from said transmitter, means for establishing a variable price coin demand responsive to a complete first pulse series, open-circuit network means coupling said means to receive said pulses and said means for establishing a coin demand, means for closing said open-circuit network means responsive only to said pulses from said second pulse series to enable actuation of said means for establishing a coin demand by a complete first pulse series from said means to receive pulses, means to acknowledge the coin demand established by said actuation to effectuate a purchase, recording apparatus enabled responsive to the acknowledgement of said coin demand by said acknowledging means, said recording apparatus incorporating means for recording information in accordance with said second pulse series, and means responsive to said first pulse series from said means to receive pulses for preventing operation of said recording apparatus prior to the start of said second pulse series.

3. In a selling system of the type including a transmitter having a source of a first pulse series and a second pulse series occurring recurrently and alternately representative of data including pricing data which it is desired to transmit to a receiver to enable apparatus to establish a variable price coin demand at said receiver to enable purchase at said receiver by satisfaction of said coin demand, said receiver including means to receive said pulses from said transmitter, means for establishing a variable price coin demand responsive to a complete series of said first pulse series, open-circuit network means coupling said means to receive said pulses and said means for establishing a coin demand, means for closing said open-circuit network means responsive only to pulses from said second series to enable actuation of said means for establishing a coin demand by a complete series of said first pulses, means for acknowledging the coin demand established by said means for establishing a coin demand, recording apparatus, means to enable said recording apparatus responsive to the actuation of said coin demand acknowledging means, said recording apparatus incorporating means for recording information in accordance with said second pulse series, means responsive to said first pulse series for preventing operation of said recording apparatus prior to the start of said second pulse series, and means operative to return said means for establishing a coin demand to an initial position upon cessation of pulses from said transmitter.

4. In a selling system of the type including a transmitter having a source of a first pulse series and a second pulse series occurring recurrently and alternately representative of data including pricing data which it is desired to transmit to a receiver to enable apparatus to establish a variable price coin demand at said receiver and to enable purchase at said receiver by satisfaction of said coin demand, said receiver including means to receive said pulses, means for establishing a variable price coin demand responsive to a complete first pulse series, means for recording information in accordance with a complete one of said second pulse series, a first open-circuit network means interposed between said means for establishing a coin demand and said means to receive said pulses, a second open-circuit network means interposed between said means for recording information and said means to receive said pulses, means to energize said means for recording information, a third open-circuit network means interposed between said means to energize and said recording means, means responsive to one of said second pulse series for closing said first open-circuit network means to enable a complete first pulse series to be applied from said means to receive said pulses to said means for establishing a coin demand, means to manifest satisfaction of the coin demand established by said means for establishing a coin demand, means responsive to said means to manifest satisfaction to close said third open-circuit network means to energize said means for recording information, means responsive to pulses from said first pulse series to close said second open-circuit network means to enable application of a complete second pulse series to said means for recording from said means for receiving pulses, and means responsive to a cessation of pulses from said source to restore said means for establishing a coin demand to an initial position.

References Cited in the file of this patent

UNITED STATES PATENTS

| | | |
|---|---|---|
| 1,626,807 | Gardner | May 3, 1927 |
| 2,420,693 | White | May 20, 1947 |
| 2,446,279 | Hammond | Aug. 3, 1948 |
| 2,489,638 | Handschin | Nov. 29, 1949 |
| 2,524,782 | Ferrar | Oct. 10, 1950 |
| 2,526,512 | Snell | Oct. 17, 1950 |
| 2,558,888 | Trimble | July 3, 1951 |
| 2,573,349 | Miller | Oct. 30, 1951 |
| 2,591,937 | Herrick | Apr. 8, 1952 |
| 2,610,255 | Hertog | Sept. 9, 1952 |